3,413,203
ELECTROLYTIC OXIDATION OF CERIUM
Alexander F. MacLean, Corpus Christi, Tex., assignor to Celanese Corporation of America, New York, N.Y., a corporation of Delaware
No Drawing. Filed Aug. 18, 1965, Ser. No. 480,780
8 Claims. (Cl. 204—79)

This invention relates broadly to the electrolytic oxidation of Ce (III) to Ce (IV) in the presence of chloride ions. More particularly, this invention relates to the electrolytic oxidation of Ce (III) to Ce (IV) in the presence of chloride ions and a complexing anion.

When used in the discussion of this invention Ce (III) and Ce (IV) are used to denote cerium having an oxidation state of three and four respectively. It is apparent that ceric chloride and most other ceric salts exist in aqueous solutions mainly as complex salts or polymeric species and not as $Ce^{+4}$ (cerium with a valence state of $+4$) associated with an anion alone. For this reason the anode reaction in electrolysis is probably not as simple as $Ce^{+3} - e \rightarrow Ce^{+4}$.

The electrolytic oxidation of cerous to ceric is known, however, when an acidified cerous salt solution is electrolyzed in the presence of chloride ions, chlorine gas is produced at the anode almost entirely, with the result that almost none of the Ce (III) is oxidized to Ce (IV). This is probably because the oxidation potential for chlorine is below that required to oxidize Ce (III) to Ce (IV).

It has been found unexpectedly that the addition of a complexing anion to an electrolyte containing chloride ions increases the ratio of Ce (IV) produced to $Cl_2$ produced at the anode.

Ce (IV) produced electrolytically can be used directly as an oxidizing agent in the reaction of olefinic compounds with halogen compounds as discussed in MacLean, Serial No. 473,839 assigned to the assignee of the present case. More particularly, there is described therein a method of producing $\alpha,\omega$-dihaloalkanes including 1,4-dihalobutane and 1,6-dihalohexane by reacting together in an aqueous medium ethylene and an alkali-metal halide in the presence of Ce (IV) under superatmospheric pressure according to the equations:

(I) $Ce(IV) + 2Cl^- \rightarrow Ce(III) + Cl_2^-$
(II) $Cl_2^- + CH_2=CH_2 \rightarrow Cl-CH_2-CH_2\cdot + 2Cl^-$
(III) $Cl-CH_2-CH_2\cdot + (n-1)$

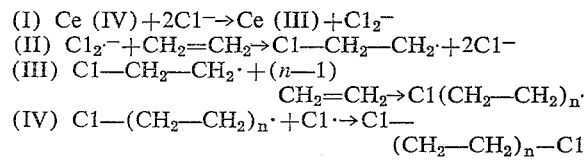

(IV) $Cl-(CH_2-CH_2)_n\cdot + Cl\cdot \rightarrow Cl-$
$(CH_2-CH_2)_n-Cl$

Regeneration of Ce (III) to Ce (IV) is a necessary step for a commerical process. This invention makes possible the regeneration of Ce (III) to Ce (IV) in the presence chloride ions by the addition of a complexing anion permitting the selective production of Ce (IV) over $Cl_2$ at the anode.

According to the process of this invention cerous salts can be electrolytically oxidized to ceric salts in the presence of chloride ions by passing an electric current through an aqueous, acidic solution comprising a cerous salt and an amount of a complexing anion sufficient to suppress the discharge potential of Ce (IV) relative to $Cl_2$ to a value allowing selective discharge of Ce (IV), the Ce (III) being continuously transformed into Ce (IV) at the anode.

Any soluble cerium salt whose anions are compatible with the reaction may be used. For example, nitrate, sulfate, and methanesulfonate salts of cerium can be used. The concentration of the cerium salts in the electrolyte generally ranges from about 0.1 to about 1.5 molar.

The complexing anions which have been found to be effective in the process according to this invention include those which decrease the potential of the Ce (IV) species present and permit the Ce (III) to be oxidized at a lower potential, resulting in decreased chlorine production. Such anions include those whose formal oxidation potential with ceric is less than 1.55 volts. Illustrative of the complexing anions which may be used include sulfate ($SO_4=$), nitrate ($NO_3^-$) and methane-sulfonate ($CH_3 So_3^-$). Any source of these anions may be used. For example, they may be added in the form of their alklai metal salts (sodium, potassium, lithium, cesium, rubidium) or as their respective cerium salts. The methanesulfonate complexing anion is preferably used because its cerium salts are quite soluble in the particular reaction medium used.

The molar concentration of the complexing anion relative to the molar concentration of chloride ion in the feed solution affects the ratio of Ce (IV) to $Cl_2$ produced at the anode. Generally the anion/$Cl^-$ ratio should range from about 1 to 5 about 6 to 1, and preferably about 2 to 1.

The molar concentration of Ce (III) relative to the complexing anion should generally be greater than 3.

The process is preferably carried out at room temperature and atmospheric pressure although higher and lower tempeatures (5 to 70° C.) and supe- and sub-atmospheric pressures can be used.

The electrolysis can be carried out in a divided or undivided cell. When an undivided cell is used Ce (IV) and chlorine gas are made at the anode and hydrogen gas and caustic at the cathode. The acidity of the electrolyte decreases during electroylsis and is made up by addition of more acid. When a divided cell is used, the anolyte is simply brine, and recoverable caustic (NaOH) is produced at the cathode as well as hydrogen gas. The porous diaphragm of the divided cell may be of any suitable material such as asbestos or an ion exchange material. The electrode material can be any material which does not interfere with the process. For example, the anode may be made from platinum, graphite or lead dioxide with a corresponding cathode of platinum or graphite. The electrodes can be of any suitable shape, e.g. rod, wire, foil, etc.

Generally anode current densities ranging from about 0.05 to 0.5 amperes per $cm.^2$ are used and preferably from about 0.1 to 0.3 amps per $cm.^2$. The current may be passed continuously or fed in pulses through the aqueous electrolyte solution. In an undivided cell the cathode current density should be at least five times the anode current density for highest efficiency.

The process is preferably carried out in an acidic medium having a pH ranging from about 0 to about 5.

Physical agitation of the feed mixture is preferable although not necessary for attaining high efficiencies. Agitation results in better mass transport and temperature control.

When the process according to the invention is used in conjunction with the preparation of $\alpha, \omega$-dihaloalkanes by the reaction of ethylene and halide ions in the presence of Ce (IV) as described previously, the Ce (III) formed as a result may be regenerated in situ or by a separate step. When regenerated by a separate step the electrolytic Ce (IV) solution can be pumped into the reactor containing ethylene and halide ions in any suitable reaction medium under pressure in suitable amounts for optimum operation.

The reaction between ethylene and an alkali metal halide using Ce (IV) as the oxidation agent can be carried out at temperatures ranging from room temperature (25° C.) to about 150° C.. preferably 80 to 100° C., presures ranging from 50 to 10,000 p.s.i., preferably from 100 to 3000 p.s.i.g. and contact times ranging from 10 minutes to 72 hours, preferably 1 to 4 hours.

The following example is given by way of illustration and is not construed as limiting in any way.

EXAMPLE I

An aqueous electrolyte solution 0.5 N in Ce (III), 1.5 N in Cl⁻, 2.5 M in sodium methanesulfonate and 0.5 M in methanesulfonic acid was placed in an undivided electrolytic cell having an anode and cathode of platinum wire at room temperature. With the electrolyte stirring at a high rate an electric current with an anode current density of 0.2 amp./sq. cm. cm.² was passed through the solution. The current efficiency to Ce (IV) from Ce (III) was 89% when 10% of the Ce (III) was converted to Ce (IV).

The resulting aqueous Ce (IV) solution was then pumped into a rocking glass-lined high pressure reactor containing an aqueous phase of spent electrolyte of the same composition described above, a pentane phase, and ethylene under 1000 p.s.i.g. and a temperature of 95° C. The reaction time was 30 minutes. The reaction products were extracted in the pentane phase as they formed. At the end of the reaction time the reaction products were removed and analyzed. The percent yields based on Ce (IV) consumed were:

| $\alpha,\omega$-dichloroalkane: | Percent |
|---|---|
| $(CH_2)_2Cl_2$ | 10 |
| $(CH_2)_4Cl_2$ | 54 |
| $(CH_2)_6Cl_2$ | 11 |
| $(CH_2)_8Cl_2$ | 4 |
| Total | 79 |

Similar runs using varying conditions are given in Table I. Instead of a glass-lined reactor, one made of a corrosion resistant metal such as tantalum or titanium may be used.

By the use of this process current efficiencies of about 80% to Ce (IV) and 15–20% to Cl₂ can be consistently obtained at a 10–15% conversion of Ce (III), resulting in an overall electrical efficiency to the $\alpha,\omega$-dihalohexane products of about 54%.

The embodiments of the invention in which an exclusive property or privilege is claimed are defined as follows:

1. Process for the electrolytic regeneration of ceric salts from cerous salts in the presence of chloride ions which comprises providing an aqueous, acidic electrolyte solution comprising a cerous salt and an amount of a complexing anion sufficient to suppress the discharge potential of Ce (IV) relative to chlorine to a value allowing selective discharge of Ce (IV), and passing an electric current through said electrolyte solution, Ce (III) being continuously transformed into Ce (IV) at the anode.

2. Process according to claim 1 wherein the complexing anion is one whose formal oxidation potential with Ce (IV) is less than 1.55 volts.

3. Process according to claim 2 wherein the complexing anion is one selected from the group consisting of $SO_4^=$, $CH_3SO_3^-$ and $NO_3^-$.

4. Process according to claim 1 wherein the process is carried out continuously.

5. Process according to claim 1 wherein the electric current passed through the solution has an anode current density ranging from about 0.05 to 0.5 amp./sq. cm.

6. Process according to claim 1 wherein the process is carried out at a temperature ranging from about 5° C. to 70° C.

7. Process according to claim 1 wherein the molar ratio of the complexing anion to the chloride ion ranges from about 1 to 5 to about 6 to 1.

8. Process for the electrolytic regeneration of ceric salt from cerous salt in the presence of chloride ions which comprises providing an aqueous, acidic electrolyte solution comprising a cerous salt in a molar concentration ranging from about 0.1 to about 1.5 and an amount of a complexing anion sufficient to suppress the discharge potential of Ce (IV) relative to chlorine and passing an electric current having an anode current density of from about 0.05 to 0.5 amp./sq. cm. through the solution, Ce (III) being continuously transformed into Ce (IV) at the anode.

TABLE I.—OXIDATION OF ETHYLENE WITH Ce (IV) FROM ELECTROLYSIS IN PRESENCE OF Cl⁻ UNDER VARIOUS REACTION CONDITIONS

| Example No | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Conc of Ce (III), N | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Conc of Cl⁻, N | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Conc of CH₃SO₃Na, M | 2.5 | 2.5 | 2.5 | 2.5 | 2.5 | 2.5 | 2.5 | 2.5 | 2.5 | 2.5 | 2.5 | 1.5 | 2.5 | 2.5 | 2.5 | 2.5 |
| Conc of CH₃SO₃H, M | 0.5 | 0.1 | 0.1 | 0.1 | 0.1 | 0.1 | 0.1 | 0.1 | 0.1 | 0.25 | 0.25 | 0.15 | 0.16 | 0.08 | 0.04 | 0.04 |
| Anode current density, A/sq. cm | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Ce (IV) current eff., percent | 74 | 76 | 68 | 76 | 78 | 80 | 80 | 80 | 70 | 88 | | 88 | 87 | 88 | 82 | 80 |
| Cl₂ current eff., percent | | 14 | 20 | 19 | 15 | 16 | 18 | 18 | 20 | 12 | | 14 | 6 | 9 | 11 | 11 |
| Oxidation of ethylene | | | | | | | | | | | | | | | | |
| Autoclave, ml | 300 | 300 | 300 | 300 | 300 | 300 | 300 | 300 | 300 | 300 | 300 | 300 | 300 | 300 | 300 | 300 |
| Gl=glass lined, Ti=titanium | Gl | Gl | Gl | Gl | Gl | Gl | Gl | Gl | Gl | Gl | Gl | Gl | Ti | Ti | Ti | Ti |
| C₂H₄ pressure, p.s.i.g | 1,000 | 1,300 | 1,300 | 1,300 | 1,300 | 1,300 | 4,300 | 4,300 | 550 | 1,300 | 1,300 | 1,300 | 1,000 | 1,000 | 1,000 | 1,000 |
| Fe, p.p.m | <5 | <5 | <5 | <5 | <5 | <5 | <5 | <5 | 2 | 2 | <5 | <5 | 2 | 10 | <10 | <10 |
| Temp., ° C | 25 | →100 | →100 | →100 | →100 | →100 | →100 | →100 | →100 | →100 | →100 | →100 | 130 | 130 | 130 | 130 |
| Run time, hr | 0.5 | 0.5 | 0.5 | 0.5 | 0.5 | 0.5 | 0.5 | 0.5 | 0.5 | 0.5 | 0.5 | 0.5 | 0.8 | 0.8 | 0.8 | 0.8 |
| Percent eff., based on Ce (IV) to: | | | | | | | | | | | | | | | | |
| (CH₂)₂Cl₂ | 33 | 23 | 21 | 11 | 12 | 13 | 12 | 9 | 11 | 73 | 53 | 68 | 34 | 23 | 10 | 11 |
| (CH₂)₄Cl₂ | 52 | 48 | 56 | 50 | 53 | 50 | 48 | 40 | 41 | 23 | 32 | 25 | 33 | 33 | 45 | 39 |
| (CH₂)₆Cl₂ | 7 | 7 | 11 | 13 | 15 | 12 | 13 | 9 | 7 | 1 | 2 | 1 | 11 | 10 | 21 | 19 |
| (CH₂)₈Cl₂ | 2 | 1 | 2 | 3 | 3 | 3 | 3 | 2 | 1 | | | | 5 | 3 | 9 | 11 |
| (CH₂)₁₀Cl₂ | | | | | | | | | | | | | 2 | | 3 | 5 |
| Total percent | 95 | 79 | 90 | 77 | 83 | 78 | 76 | 60 | 60 | 97 | 87 | 94 | 85 | 69 | 88 | 75 |

References Cited

UNITED STATES PATENTS 914,251  3/1909  Ellis et al. _____ 204—81
1,264,535  4/1918  McElroy _____ 204—81

HOWARD S. WILLIAMS, Primary Examiner.

H. M. FLOURNOY, Assistant Examiner.